(12) United States Patent
Dibos et al.

(10) Patent No.: US 9,431,685 B2
(45) Date of Patent: Aug. 30, 2016

(54) BATTERY ARRANGEMENT FOR USE IN A MOTOR VEHICLE

(71) Applicant: Dr. Ing. h.c. F. Porsche Aktiengesellschaft, Stuttgart (DE)

(72) Inventors: Hermann Dibos, Remchingen (DE); Bjoern Pehnert, Tamm (DE); Thierry Mingers, Sospel (FR)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 107 days.

(21) Appl. No.: 14/096,655

(22) Filed: Dec. 4, 2013

(65) Prior Publication Data

US 2014/0162099 A1 Jun. 12, 2014

(30) Foreign Application Priority Data

Dec. 7, 2012 (DE) .................. 10 2012 111 969

(51) Int. Cl.
*H01M 10/625* (2014.01)
*H01M 10/63* (2014.01)
*H01M 10/613* (2014.01)

(52) U.S. Cl.
CPC ....... *H01M 10/5016* (2013.01); *H01M 10/613* (2015.04); *H01M 10/625* (2015.04); *H01M 10/63* (2015.04)

(58) Field of Classification Search
None
See application file for complete search history.

(56) References Cited

U.S. PATENT DOCUMENTS

| | | | | |
|---|---|---|---|---|
| 5,354,625 A | * | 10/1994 | Bentz | H01M 6/46 429/407 |
| 2008/0220315 A1 | * | 9/2008 | Dougherty | H01M 2/1077 429/53 |
| 2008/0264291 A1 | * | 10/2008 | Pike | B60L 11/1874 105/50 |
| 2009/0263711 A1 | * | 10/2009 | Kim | H01M 2/0404 429/164 |
| 2011/0189523 A1 | * | 8/2011 | Eom | 429/120 |

FOREIGN PATENT DOCUMENTS

DE  10 2004 021 280  6/2005

* cited by examiner

*Primary Examiner* — Patrick Ryan
*Assistant Examiner* — Christopher Domone
(74) *Attorney, Agent, or Firm* — Gerald E. Hespos; Michael J. Porco; Matthew T. Hespos

(57) ABSTRACT

A battery arrangement for a motor vehicle has a battery housing (4) with battery cells (6, 8) arranged by a holding apparatus (14). The battery cells (6, 8) are connected electrically to one another via a cell connecting element (14). A cooling arrangement (20, 22, 24, 26) cools the battery cells (6, 8) with a cooling medium. The cooling arrangement has a first one flow space (20), a conveying device and a heat exchanger for the cooling medium. Cell poles (10, 12) of the battery cells (6, 8) are arranged on the cell connecting element (14) and a printed circuit board (18) is parallel to the cell connecting element (14). A second flow space (22) is formed between the printed circuit board (18) and the cell connecting element (14) and has openings (24) in the region of the battery cells (6, 8) arranged on the cell connecting element (14).

7 Claims, 1 Drawing Sheet

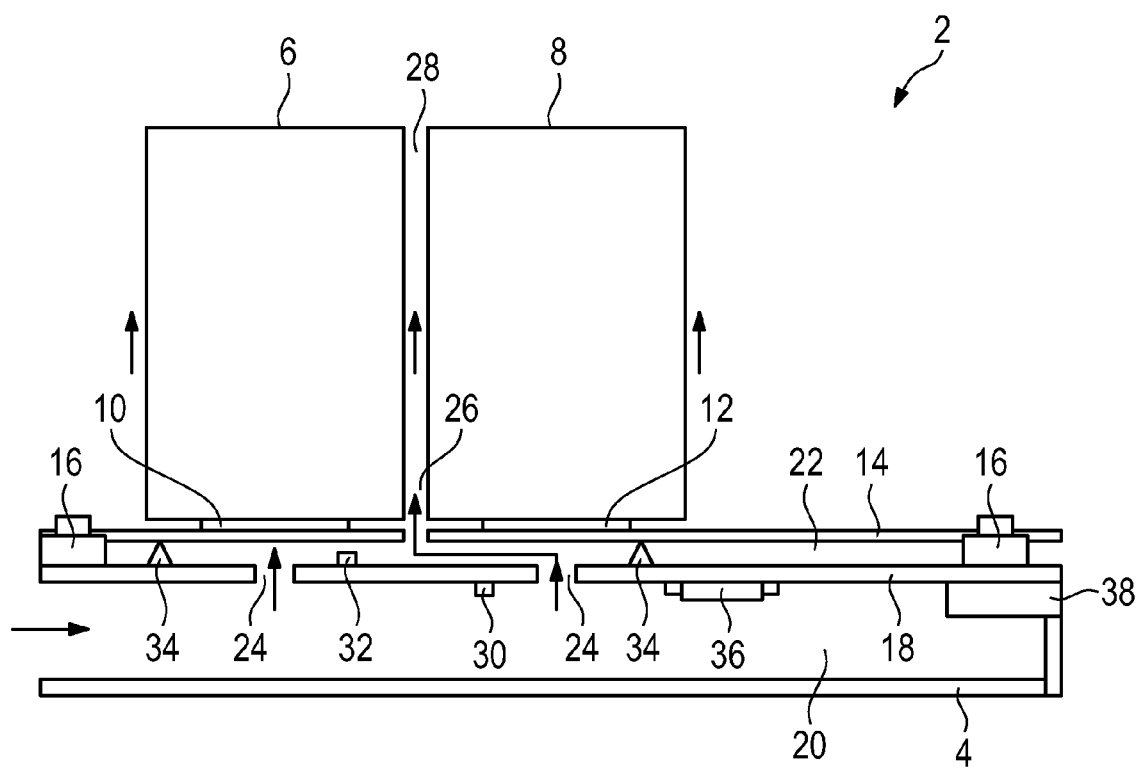

BATTERY ARRANGEMENT FOR USE IN A MOTOR VEHICLE

CROSS REFERENCE TO RELATED APPLICATION

This application claims priority under 35 USC 119 to German Patent Appl. No. 10 2012 111 969.4 filed on Dec. 7, 2012, the entire disclosure of which is incorporated herein by reference.

BACKGROUND

1. Field of the Invention

The invention relates to a battery arrangement for a motor vehicle. The battery arrangement has a battery housing in which at least two battery cells are arranged by a holding apparatus. The battery cells are connected electrically to one another via a cell connecting element. A cooling arrangement cools the battery cells with a cooling medium. The cooling arrangement has at least one flow space, a conveying device and a heat exchanger for the cooling medium.

2. Description of the Related Art

Battery arrangements have an increased importance in motor vehicles with a hybrid drive or in fuel cell vehicles. The battery arrangements have battery cells, such as lithium ion cells, electrically connected in series and/or in parallel. These battery cells must be cooled to provide a high degree of performance over the entire service life. In addition, these battery arrangements have high demands for an installation space. Furthermore, extremely complex control arrangements are needed to ensure optimum use and functionality of these battery arrangements.

DE 10 2004 021 280 B3 describes a battery arrangement having a battery housing in which a number of battery cells are arranged. The battery cells are cooled by a cooling arrangement. Although this document discloses a compact arrangement, it still has considerable disadvantages with respect to the installation space to be provided and complicated mounting in terms of control.

The object of the invention is to avoid the abovementioned disadvantages.

SUMMARY OF THE INVENTION

This object is achieved by a battery arrangement where the cell poles of the battery cells are arranged on a cell connecting element. A printed circuit board is provided parallel to the cell connecting element in such a manner that a first flow space is formed between a battery housing part and the printed circuit board and a second flow space is formed between the printed circuit board and the cell connecting element. The printed circuit board has first openings in the region of the battery cells arranged on the cell connecting element. The battery arrangement provides a simple, fast and cost-effective mounting in a small installation space.

The cell connecting element may be arranged on the printed circuit board by spacers that create the second flow space and ensure a vibration-resistant arrangement.

The first openings may be nozzles that achieve efficient cooling, particularly in the region of the cell poles, which is exposed to the highest thermal load. The printed circuit board may have temperature sensors in the first and second flow spaces to adapt the cooling optimally to the respective boundary conditions and the load on the battery arrangement. Contact elements may be provided between the printed circuit board and the cell connecting element for measuring a cell voltage.

A third flow space may be provided where the battery cells are arranged, and the cell connecting element may have second openings for the cooling medium, thereby easily achieving inter-cell cooling of the individual battery cells.

The printed circuit board may have a plug connection element to achieve a modular structure.

The cooling medium preferably is a dielectric cooling oil.

The invention is explained in more detail below using the drawing.

BRIEF DESCRIPTION OF THE DRAWINGS

The single FIGURE shows a schematic partial view of a battery arrangement according to the invention.

DETAILED DESCRIPTION OF THE PREFERRED EMBODIMENTS

A battery arrangement 2 for use in a motor vehicle (not illustrated any further) has a battery housing, only a battery housing part 4 of which is illustrated here. Battery cells 6, 8 are arranged in the battery housing part 4. The battery cells 6, 8 have, in a known manner, cell poles 10, 12, only a front cell pole of which is illustrated. The cell poles 10, 12 of the battery cells 6, 8 are arranged on a cell connecting element 14 in a form-fitting and/or force-fitting manner. The cell connecting element 14 is a metal sheet that easily provides electrical contact between the individual battery cells 6, 8 and reliably ensures a vibration-resistant arrangement of the battery cells 6, 8 in the battery arrangement. The cell connecting metal sheet 14 is fastened on a printed circuit board 18 by spacers 16. The printed circuit board 18, in turn, is arranged on the battery housing part 4 so that a first flow space 20 is enclosed by the printed circuit board 18 and the battery housing part 4. The spacers 16 keep the cell connecting element 14 and the printed circuit board 18 spaced apart to define a second flow space 22 that is connected fluidically to the first flow space 20 via first openings 24. The cell connecting element 14 also has second openings 26 to define a third flow space 28 in which the battery cells 6, 8 are arranged.

The arrows in the FIGURE indicate a flow profile of a cooling medium. A dielectric cooling oil can be advantageously used as the cooling medium. A conveying device (not illustrated) is used to pump the cooling oil cooled by a heat exchanger (not illustrated any further) into the flow space 20. The cooling oil is injected into the flow space 22 via the openings 24 in the form of nozzles. The openings 24 are arranged in the region of the cell poles 10. As a result, the cooling oil first strikes the components subjected to the greatest thermal load. The cooling oil then passes into the third flow space 28 via the second openings 26 to ensure cooling of the individual battery cells 6, 8. The cooling oil then is supplied, in a known manner, to the conveying device and the heat exchanger again. The printed circuit board 18 has a temperature sensor 30 in the first flow space 20 and a temperature sensor 32 in the second flow space 22 to ensure optimal cooling. Thus, the cooling temperature can be controlled on the basis of the respective boundary conditions and the load on the battery arrangement. Contact elements 34 are provided between the cell connecting element 14 and the printed circuit board 18 to transmit the value of the respective cell voltage to a controller (not illustrated any further). Furthermore, the printed circuit board 18 also has electronic components 36.

To ensure simple mounting and modular expansion, a plug connection element 38 also is provided, as a result of which a form-fitting electrical connection to a further printed circuit board or battery arrangement is possible.

What is claimed is:

1. A battery arrangement for a motor vehicle, comprising:
   a battery housing having an outer wall;
   a printed circuit board mounted to the battery housing and spaced from the outer wall to define a first flow space between the outer wall and the printed circuit board, and openings formed through the printed circuit board;
   a cell connecting element mounted to the printed circuit board and having opposite first and second surfaces, the first surface facing the printed circuit board and spaced therefrom to define a second flow space between the cell connecting element and the printed circuit board, the first flow space and the second flow space being in communication with each other through the openings in the printed circuit board, the cell connecting element being formed with openings extending therethrough at locations offset from the openings in the printed circuit board; and
   battery cells provided respectively with cell poles mounted to the second surface of the cell connecting element at positions opposed respectively to the openings in the printed circuit board, the battery cells being spaced from one another to define third flow spaces between the battery cells and aligned with the openings in the cell connecting element, the third flow spaces being in communication with the second flow space via the openings in the cell connecting element, so that the battery arrangement is configured to allow a cooling medium to flow from the first flow space into the second flow space at locations opposed to the cell poles via the openings in the printed circuit board, and into the third flow space between the battery cells via the openings in the cell connecting element to cool the battery arrangement.

2. The battery arrangement of claim 1, wherein the cell connecting element is spaced from the printed circuit board by spacers.

3. The battery arrangement of claim 2, wherein the openings in the printed circuit board are nozzles.

4. The battery arrangement of claim 1, wherein the printed circuit board has temperature sensors in the first and second flow spaces.

5. The battery arrangement of claim 1, further comprising contact elements between the printed circuit board and the cell connecting element for measuring a cell voltage.

6. The battery arrangement of claim 1, wherein the printed circuit board has a plug connection element.

7. The battery arrangement of claim 1, wherein a dielectric cooling oil is provided as the cooling medium.

* * * * *